United States Patent
Maloney et al.

(10) Patent No.: US 10,574,558 B1
(45) Date of Patent: Feb. 25, 2020

(54) LIMITING ALARMS IN AN ASSET MONITORING SYSTEM

(71) Applicant: Equinix, Inc., Redwood City, CA (US)

(72) Inventors: William Maloney, Fullerton, CA (US); Pamela Brigham, Dublin, CA (US); Marcelo Schmidt, Los Gatos, CA (US); Ernest A Holloway, Jr., Morgan Hill, CA (US); Christopher W Nigh, Oreland, PA (US)

(73) Assignee: Equinix, Inc., Redwood City, CA (US)

( * ) Notice: Subject to any disclaimer, the term of this patent is extended or adjusted under 35 U.S.C. 154(b) by 285 days.

(21) Appl. No.: 15/374,573

(22) Filed: Dec. 9, 2016

Related U.S. Application Data

(60) Provisional application No. 62/385,562, filed on Sep. 9, 2016.

(51) Int. Cl.
*H04L 12/24* (2006.01)
*H04L 12/26* (2006.01)
*H04L 29/08* (2006.01)

(52) U.S. Cl.
CPC .......... *H04L 43/10* (2013.01); *H04L 43/0823* (2013.01); *H04L 67/26* (2013.01)

(58) Field of Classification Search
CPC ...... H04L 43/10; H04L 43/0823; H04L 67/26
USPC ........................................................ 709/224
See application file for complete search history.

(56) References Cited

U.S. PATENT DOCUMENTS

| | | | | |
|---|---|---|---|---|
| 2009/0058631 A1* | 3/2009 | Wall | ........................ | G08B 21/20 340/517 |
| 2010/0100775 A1* | 4/2010 | Slutsman | ............... | G06F 11/079 714/47.2 |
| 2011/0145836 A1* | 6/2011 | Wheeler | .................. | G06F 9/546 719/314 |
| 2013/0238795 A1* | 9/2013 | Geffin | ..................... | G06F 1/206 709/224 |
| 2015/0364032 A1* | 12/2015 | Mello | ................... | G08B 29/185 340/514 |
| 2016/0127454 A1 | 5/2016 | Maheshwari et al. | | |
| 2016/0308762 A1 | 10/2016 | Teng et al. | | |
| 2017/0104706 A1* | 4/2017 | Hilemon | .................. | H04L 51/12 |

OTHER PUBLICATIONS

U.S. Appl. No. 62/353,471, entitled Architecture for Data Center Infrastructure Monitoring, filed Jun. 22, 2016.

\* cited by examiner

*Primary Examiner* — Moustafa M Meky
*Assistant Examiner* — Elizabeth Kassa
(74) *Attorney, Agent, or Firm* — Shumaker & Sieffert, P.A.

(57) ABSTRACT

In one example, a method includes receiving, by a computing system, first data defining an alarm associated with an infrastructure asset, the alarm having an alarm condition that causes a notification to be output indicating the alarm condition is met, and receiving, by the computing system, second data defining a one-time trigger condition for the alarm. The method also includes, in response to determining that the alarm condition is met and the one-time trigger condition for the alarm has not been met at least once, suppressing, by the computing system, output of notifications for the alarm, and in response to determining that the alarm condition is met and the one-time trigger condition for the alarm has been met at least once, outputting, by the computing device and for display, the notification indicating the alarm condition is met.

16 Claims, 10 Drawing Sheets

LIMITING ALARMS IN AN ASSET MONITORING SYSTEM

This application claims the benefit of U.S. Provisional Application No. 62/385,562 filed Sep. 9, 2016, the entire content of which is incorporated herein by reference.

TECHNICAL FIELD

The disclosure relates to infrastructure management and, more specifically, to monitoring infrastructure assets.

BACKGROUND

A facility such as a data center may include a storage volume storing numerous electronic devices that produce heat, including network, server, and storage gear, as well as power distribution units for distributing power to devices within the facility, for example. The facility may also include mechanical devices, such as cooling units to supply a cool air stream into the storage volume. The electronic device and mechanical devices are examples of infrastructure assets of the facility. An operator of the facility may wish to monitor status of infrastructure assets within the data center. In some examples, data center facilities may be shared by the multiple tenants locating networking equipment within the data centers.

SUMMARY

In general, techniques are described for limiting unnecessary alarms in a monitoring or control system. In some examples, data collected from infrastructure assets associated with the monitoring or control system may be processed and presented to system operators. A monitoring or control system such as an asset monitoring system may be configured with alarm rules that cause the system to output alarm notifications when the collected data indicates at least one of the infrastructure assets has experienced an alarm condition specified in an alarm rule. The techniques of this disclosure allow for an operator of the asset monitoring system to configure, in addition to an alarm condition in the asset monitoring system, a one-time trigger condition associated with the alarm condition.

The one-time trigger condition applies such that the asset monitoring system will not output an alarm notification for the alarm until the asset monitoring system determines the one-time trigger condition associated with the alarm has been met, i.e., even if the asset monitoring system detects the alarm condition that would normally cause the asset monitoring system to output an indication of the alarm condition. After the asset monitoring system determines the one-time trigger condition for the alarm has been met, the asset monitoring system outputs the indication of the alarm condition for any subsequently-detected alarm condition.

In one example, a method includes receiving, by a computing system, first data defining an alarm associated with an infrastructure asset, the alarm having an alarm condition that causes a notification to be output indicating the alarm condition is met, and receiving, by the computing system, second data defining a one-time trigger condition for the alarm. The method also includes, in response to determining that the alarm condition is met and the one-time trigger condition for the alarm has not been met at least once, suppressing, by the computing system, output of notifications for the alarm, and in response to determining that the alarm condition is met and the one-time trigger condition for the alarm has been met at least once, outputting, by the computing device and for display, the notification indicating the alarm condition is met.

In a further example, a computing device includes an asset monitoring system module configured to receive first data defining an alarm associated with an infrastructure asset, the alarm having an alarm condition that causes a notification to be output indicating the alarm condition is met, and receive second data defining a one-time trigger condition for the alarm. The computing device also includes a rules engine configured to determine whether the alarm condition is met and determine whether the one-time trigger condition for the alarm is met, wherein the asset monitoring system module is configured to, in response to the rules engine determining that the alarm condition is met and the one-time trigger condition for the alarm has not been met at least once, suppress output of notifications for the alarm. The computing device further includes an output device, wherein the asset monitoring system module is configured to, in response to the rules engine determining that the alarm condition is met and the one-time trigger condition for the alarm has been met at least once, cause the output device to output for display the notification indicating the alarm condition is met.

In another example, a computer-readable storage medium includes instructions that, when executed by at least one programmable processor of at least one computing device, cause the at least one computing device to receive first data defining an alarm associated with an infrastructure asset, the alarm having an alarm condition that causes a notification to be output indicating the alarm condition is met, receive second data defining a one-time trigger condition for the alarm, in response to determining that the alarm condition is met and the one-time trigger condition for the alarm has not been met at least once, suppress output of notifications for the alarm, and in response to determining that the alarm condition is met and the one-time trigger condition for the alarm has been met at least once, output for display the notification indicating the alarm condition is met.

The techniques of this disclosure may provide one or more advantages, such as allowing definition of alarm rules that do not produce alarms until a threshold condition is met, where the threshold condition may be defined in terms of some indication that the alarmed asset has been commissioned or deployed and is no longer a spare. This may avoid nuisance alarms, which may reduce the amount of alarm notifications the asset monitoring system needs to send, and allow operators to focus attention on legitimate alarms without the distraction of nuisance alarms. Reducing alarm notifications may improve the functioning of computing devices in the asset monitoring system by conserving computing resources, for example. The techniques of this disclosure may be particularly useful in avoiding nuisance alarms on spare devices when alarms are automatically preconfigured for assets, such as when assets are configured in batches or based on template definitions according to asset type.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

FIG. 6 depicts an example user interface of an asset monitoring system such as the asset monitoring system of FIG. 1.

FIG. 7 depicts another example user interface of an asset monitoring system.

FIG. 8 is a block diagram illustrating an example user interface for presenting an option to an operator to retrigger an Enable Threshold Condition for an alarm.

Like reference characters denote like elements throughout the figures and text.

DETAILED DESCRIPTION

Figure 1:
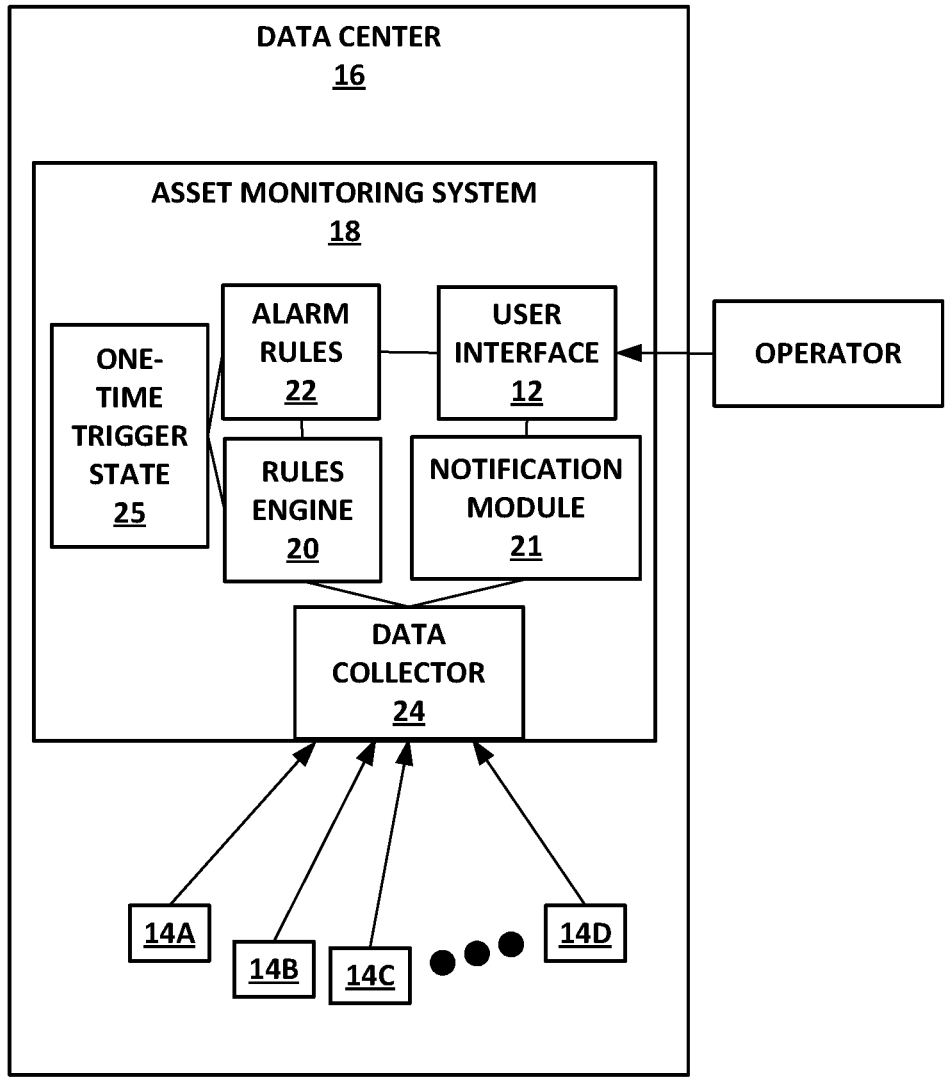
FIG. 1 is a block diagram illustrating an example data center having infrastructure assets and an asset monitoring system, in accordance with techniques described herein.

FIG. 1 is a block diagram illustrating an example data center 16 having infrastructure assets 14A-14D ("infrastructure assets 14") and an asset monitoring system 18, in accordance with techniques described herein. Data collector 24 of asset monitoring system 18 collects data from the infrastructure assets 14. The data collected may relate to operation or conditions of the infrastructure assets 14.

Infrastructure assets 14 are physical infrastructure assets 14 that enable operation of a physical building and Information Technology (IT) systems located within the data center 16. In some examples, assets 14 may include devices related to security, lighting, electrical, mechanical, structural integrity, occupancy, or energy credits, for example. For example, the assets 14 may include physical structure related to power systems and/or cooling systems associated with controlling the environment within data center 16, such as temperature sensors, HVAC (heating ventilation and air conditioning) units, CRAC (computer room air conditioning) units, uninterruptible power supplies (UPSs), generators, PDUs (power distribution units), AHUs (air handling units), switchgears, circuit breakers, fire alarms, substations, chillers, humidifiers, cooling towers, fan coil units, heat exchangers, condensers, and power units, for example. In some examples, assets 14 may be "smart" devices, i.e., physical objects that contain embedded technology configured to provide some degree of computing intelligence. These smart devices may communicate and sense or interact with their internal states or the external environment. For example, assets 14 have associated sensor(s) that sense conditions, and interfaces that output data indicative of the sensed conditions.

Although described for purposes of example with respect to a data center, the techniques of disclosure may apply to any type of monitoring or control systems for a variety of types of facilities. Other examples include factories, power plants, network operations centers, airports, and other facilities.

Asset monitoring system 18 monitors the infrastructure assets 14 and raises alarms when one or more of the infrastructure assets 16 encounters an alarm condition. For example, the asset monitoring system 18 may raise alarms by sending a notification to an operator of data center 16. The operator may, in some examples, define alarms and alarm conditions via a user interface 12 of the asset monitoring system 18. Asset monitoring system 18 stores the alarms and alarm condition definitions associated with the alarms to alarm rules 22. The operator may define alarms for different tag points of an infrastructure asset. Tag points, also referred to as "data points," "points," or "tags," are parameters associated with an infrastructure asset for which data can be collected from the infrastructure asset. Some example data points for which alarms may be defined include voltage, current, temperature, humidity, and fluid level, for example.

In some examples, data collector 24 collects asset tag points and may perform data interfacing. In some examples, data collector 24 includes interfaces for various protocols by which data collector 24 receives data from building management systems (BMSs), control systems, and meters, such as Open Platform Communications Data Access (OPC DA), Building Automation and Control Networks (BACNet), Modbus, Modbus over Ethernet (Modbus/E), eXtensible Markup Language (XML)/Simple Object Access Protocol (SOAP), and Simple Network Management Protocol (SNMP), for example.

Rules engine 20 analyzes the collected data and applies the alarm rules 22 to determine whether any of alarm rules 22 indicates an alarm condition has occurred. In response to rules engine 20 determining that an alarm condition has occurred, notification module 21 of asset monitoring system 18 may output a notification for the alarm to the operator. For example, notification module 21 may output the notification via email using Simple Mail Transfer Protocol (SMTP), via a Short Message Service (SMS) message, or via user interface 12, for example.

In monitoring systems, an operator of asset monitoring system 18 can define alarm conditions (also known as alarm limits or alarm thresholds) for data points, and the data points are considered to be in an alarm state any time the data point value is within conditions defined for the alarm. For data points from a piece of equipment which is a spare or not yet commissioned, this may result in data points being in an alarm state when the data point is initially entered into the system, in some cases before the piece of equipment is in active use. This is referred to as a nuisance alarm, as the equipment is a spare and the alarm does not indicate an actual problem with the equipment because the equipment is not in use. The presence of nuisance alarms may cause operators to give less regard to critical, legitimate system alarms. One example of a spare piece of equipment is a circuit breaker that is configured in an open position when not in use.

Asset monitoring system 18 may provide an option for defining alarms such that a given alarm will be suppressed when a particular condition for the alarm is true. An operator can define conditional alarms that allow the alarm condition to trigger an alarm only if the particular condition is true. In some cases, an operator defines an alarm for a first tag point (e.g., for asset 14A) in terms of a condition associated with a second tag point (e.g., for asset 14B), referred to as a suppression point. Asset monitoring system 18 monitors the value of the second tag point in the system, which also has triggers defined. With the conditional alarm, the alarm is suppressed every time the suppression point is not in the condition which would allow alarms. For example, a system may be configured to suppress a discharge temperature alarm on an air handler when the air handler fan is not running. This type of suppression occurs every time the suppression condition is true.

In accordance with the techniques of this disclosure, asset monitoring system 18 is configured to provide an option for one or more of alarm rules 22 to be associated with a one-time trigger condition that must be met before asset monitoring system 18 will output an alarm notification for the data point referenced in the alarm rule 22. Asset monitoring system 18, when evaluating an alarm rule for a data point that includes an associated one-time trigger condition, suppresses alarm notifications for the data point if the asset monitoring system 18 determines the one-time trigger condition has not been met.

In the example of FIG. 1, asset monitoring system 18 presents user interface 12 configured to provide an option for an operator to define respective one-time trigger conditions for one or more alarm rules 22. User interface 12 presented by asset monitoring system 18 enables an operator to configure, in addition to an alarm condition for a data point in the asset monitoring system, a one-time trigger condition for the data point. The one-time trigger condition can be considered an event or occurrence that "enables" the alarm condition of the alarm rule 22, and may also be referred to as an Enable threshold condition because it is a threshold condition to enable the alarm. In response to receiving an indication of a user input defining a one-time trigger condition for an alarm, asset monitoring system 18 stores the one-time trigger condition in association with the alarm, e.g., to alarm rules 22.

Asset monitoring system 18 may also store one-time trigger state 25, which indicates whether a configured one-time trigger condition has occurred at any point since the alarm was configured with the one-time trigger condition. Asset monitoring system 18 may store corresponding state for all one-time trigger conditions indicating whether each of the one-time trigger conditions has been met. In some examples, one-time trigger state 25 may be a data structure storing data representing a plurality of flags, where the flags are set or clear according to whether the corresponding one-time trigger conditions have been met. In an initial state, the flags associated with each of the defined one-time trigger conditions are clear (not set). In response to determining that a particular one-time trigger condition has occurred, asset monitoring system 18 may set the flag in one-time trigger state 25 associated with the particular one-time trigger condition to indicate the one-time trigger condition occurred.

For an alarm rule 22 having an associated one-time trigger condition, asset monitoring system 18 will not enable the alarm output until asset monitoring system 18 determines the one-time trigger condition has been met (e.g., the flag in one-time trigger state 25 is set), even if the alarm condition which would normally cause the alarm output is true. Conversely, asset monitoring system 18 will enable the alarm output (e.g., notification module 21 may send a notification regarding the alarm) in response to determining that the alarm condition is true and the one-time trigger condition has occurred at least once, based on one-time trigger state 25, even if the one-time trigger condition is not currently occurring at the time the alarm condition is true.

The techniques of this disclosure may provide an option for an operator to configure alarms to be automatically enabled for data points when certain conditions are met, without requiring operator intervention at the time the alarm is to be enabled. The operator may define one-time trigger conditions to equate to equipment being brought into service, but one-time trigger conditions are not limited to being defined for that specific condition. That is, a one-time trigger condition may occur subsequent to the equipment that includes the data point being brought into service. The techniques of this disclosure may avoid the need for operators to manually configure alarms when equipment is brought online, which may be labor intensive and prone to operator error due to lack of knowledge of procedure or because of data entry errors. Additionally, the techniques of this disclosure provide a user interface configured to allow an operator to reset a one-time trigger for a data point to cause asset monitoring system 18 to again suppress any alarms for the data point until the one-trigger condition is again met. For example, an operator may reset the one-time trigger for a data point in alarm when the operator is aware that the equipment associated with the data point has been temporarily removed from service. In response to a reset for a one-time trigger, asset monitoring system 18 may reset (e.g., clear the flag for) the corresponding one-time trigger state in one-time trigger state 25.

In one example, the techniques of this disclosure may be applied in a Branch Circuit Monitoring (BCM) system. BCM systems provide monitoring of electrical capacity and power usage. BCM systems enable monitoring of individual circuits, which can enable segregation of multiple users, tenants, or devices. In the context of a Branch Circuit Monitoring (BCM) system, for example, asset monitoring system 18 may receive a user input defining an alarm on a circuit monitored by the BCM, and the alarm may have a one-time trigger applied as described herein such that the configured alarm is only enabled (such that it may alert if an alarm condition is detected) after the BCM detects that the circuit draws at least a threshold current (e.g., 2 Amps) for some time period (e.g., at least 15 minutes, at least 4 hours or other time period). The threshold current may be any current within the range of the circuit, e.g., between 0-100 Amps. Requiring an initial time period may ensure that any current flow is not due to inductive currents.

In other examples, asset monitoring system 18 may be part of a data center infrastructure monitoring framework, such as DCIM system described in U.S. Application No. 62/353,471, entitled ARCHITECTURE FOR DATA CENTER INFRASTRUCTURE MONITORING, filed Jun. 22, 2016, the entire contents of which are incorporated by reference herein. For example, the DCIM system may include multiple data centers located within a single continent, or may include multiple data centers located within multiple continents. Each of the multiple data centers located within a given continent include multiple physical infrastructure assets 14 that enable operation of a physical building and IT systems located within the respective data center.

Each of the assets may be communicatively coupled to a corresponding DCIM edge system. For example, each of the data centers may communicate data associated with the assets with the corresponding DCIM edge system via one or more of a metro Ethernet network, the Internet, a mobile backhaul network, or a Multiprotocol Label Switching (MPLS) access network. DCIM edge systems 16 may each be located within geographically distributed colocation facility provider facilities (not shown and hereinafter, "colocation facilities"), e.g., colocation data centers, each associated with (e.g., owned and/or operated by) a single colocation facility provider. The colocation service provider is a single entity, business, operator, service provider, or the like. In some examples, the colocation service provider operates an internet exchange, Ethernet exchange, and/or a cloud exchange, such as described in U.S. application Ser. No. 15/099,407, entitled CLOUD-BASED SERVICES EXCHANGE, filed Apr. 14, 2016, the entire contents of which are incorporated by reference herein.

Although described for purposes of example in terms of an operator of data center 16 creating alarms having one-time triggers to enable the alarms, in some examples a customer of the data center 16 may be presented with a user interface for creating alarms having one-time triggers to enable the alarms, in accordance with the techniques of this disclosure, where the alarms are only for equipment of the customer in the data center 16.

In some examples, asset monitoring system 18 may receive input for defining a one-time trigger condition to trigger based on a different asset or system than the asset for which the alarm is configured. For example, a one-time trigger condition may be defined to be true when a temperature sensor in a customer cage of a colocation facility detects the temperature has been between 68 degrees Fahrenheit and 74 degrees for at least 24 or 48 hours. This may be an indication that the customer cage has been commissioned, as prior to commissioning the customer cage may not be temperature controlled in the same way as a commissioned space. As another example, a one-time trigger condition may be defined in terms of a rate of change over time, rather than in terms of absolute values.

As another example, the one-time trigger condition may be defined to trigger based on a different data source, such as a different System of Record (e.g., customer data records). For example, a one-time trigger condition may be defined to be true when customer data indicates a customer cage space has been commissioned, e.g., leased to a customer, or that a customer lease has been terminated. Thus, in this example asset monitoring system 18 is configured to not enable an alarm unless and until the customer cage space is likely to be in use. In some examples, an occupancy sensor reading may be defined as a one-time trigger condition, such as a camera or motion sensor. As a further example, a one-time trigger condition may be defined as detecting chilled water flow to a space (e.g., data center cabinet) for cooling.

Asset monitoring system 18 may represent or include one or more applications executing by one or more computing devices within data center 16 or alternatively, off-site/remotely at a back office or branch of the data center 16 provider, for instance. Although shown as controlling and/or monitoring a single data center 16, asset monitoring system 18 may monitor and/or control for multiple different data centers, which may be geographically-distributed. Alternatively or additionally, multiple separate asset monitoring system 18 may be employed by the data center 16 provider to control and/or monitor assets for respective multiple different data centers.

Figure 2:
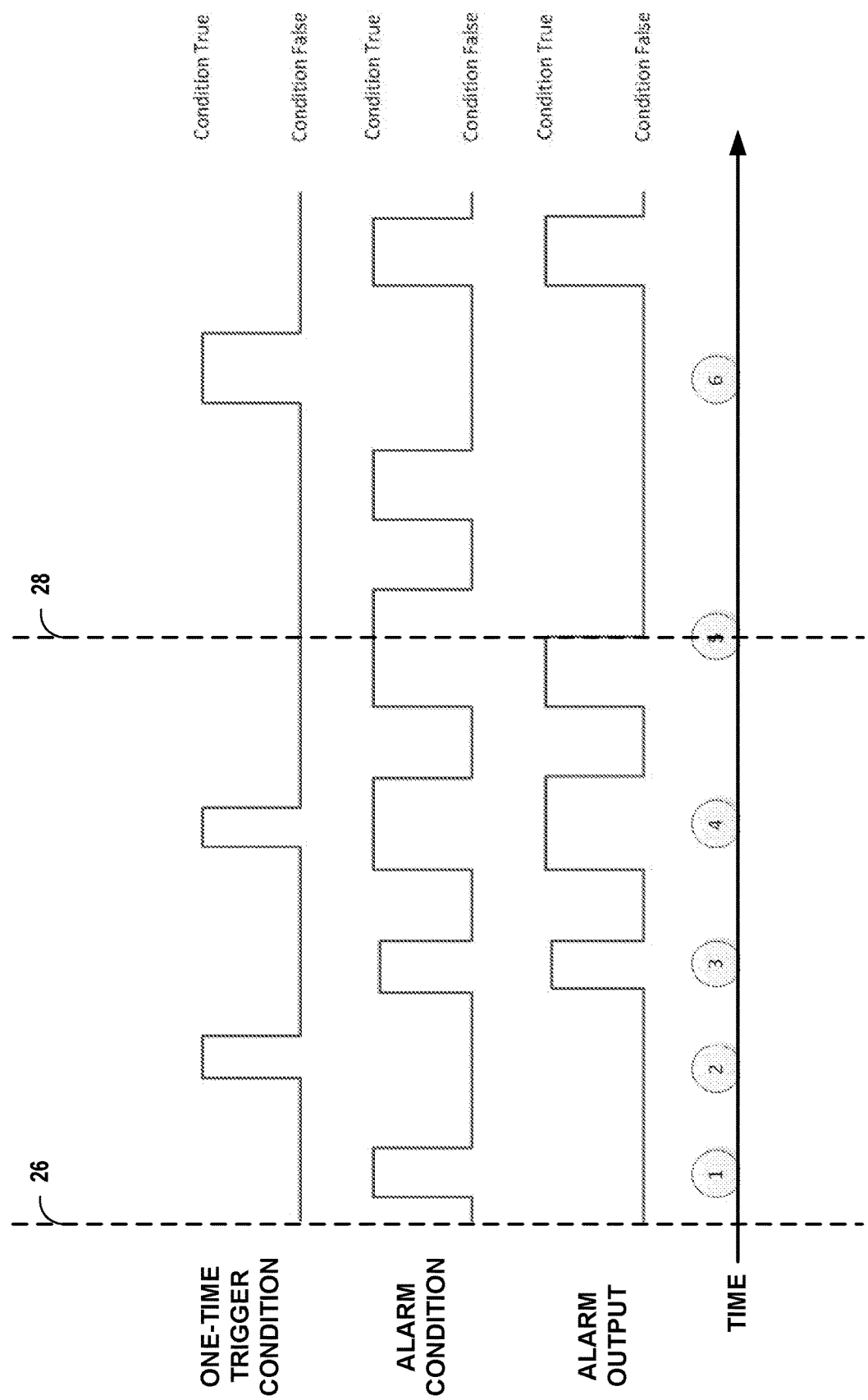
FIG. 2 is a timing diagram illustrating example states of the asset monitoring system for an alarm having an alarm condition, a one-time trigger associated with the alarm condition, and alarm output for the alarm.

FIG. 2 is a timing diagram illustrating example states of asset monitoring system 18 for an alarm having an alarm condition, a one-time trigger associated with the alarm condition, and alarm output for the alarm. FIG. 2 shows depicts the state of the alarm output over time as determined by asset monitoring system 18 based on the current and previous states of the one-time trigger and the alarm condition. The dashed line 26 indicates asset monitoring system 18 has received an indication of a user input requesting to apply a one-time trigger, in accordance with the techniques of this disclosure. As shown in FIG. 2, at a first time 1, the asset monitoring system 18 has been configured and the alarm condition is true, but the alarm output is false because the one-time trigger has not yet been true. At time 2, the one-time trigger is true. The alarm in enabled, but no alarm output is active because the alarm condition is not true. At time 3, the alarm condition is true and the alarm output is true because the alarm condition is true and one-time trigger has been true. At time 4, the one-time trigger is again true, and FIG. 2 shows that the additional true condition of the one-time trigger has no effect on alarm output, which remains true because the alarm condition is true at this time and the one-time trigger has already been true (at time 2). At time 5, asset monitoring system 18 receives an indication of a user input requesting to reset the one-time trigger, as shown by dashed line 28. This causes asset monitoring system 18 to determine the alarm output as though the one-time trigger has not yet been true, which causes asset monitoring system 18 to turn the alarm output off at time 5 and prevents the alarm output from turning on again until such time as the one-time trigger has again become true. At time 6, the one-time trigger condition is again met and the alarm is again enabled such that the subsequent alarm condition being met causes asset monitoring system 18 to output the alarm.

Figure 3:
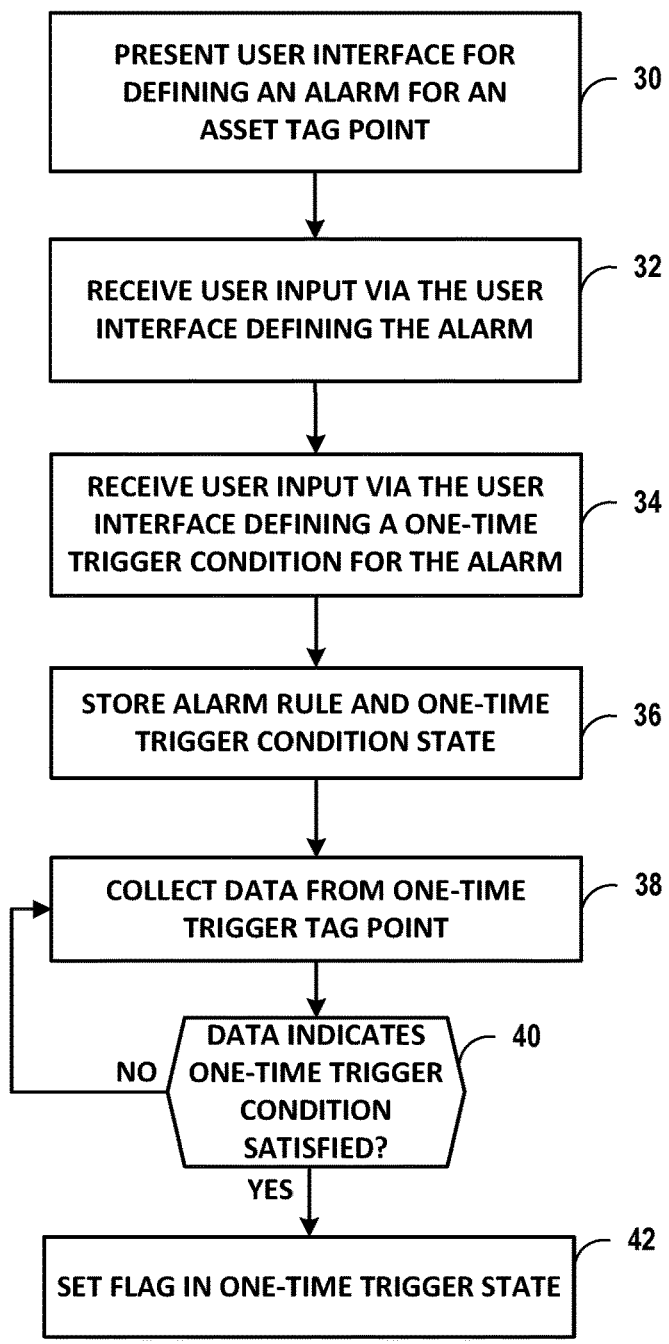
FIG. 3 is a flowchart illustrating example operation of a system according to aspects of the techniques of this disclosure.

FIG. 3 is a flowchart illustrating example operation of a system according to aspects of the techniques of this disclosure. FIG. 3 will be described for purposes of example with regard to asset monitoring system 18 of FIG. 1. User interface 12 presents a user interface for defining an alarm for an asset tag point, such as a tag point for asset 14A (30). For example, the user interface for defining an alarm may output for display a window or webpage presented to an operator of data center 16 via a portal application executing on a computing device. User interface 12 receives one or more user inputs via the user interface defining the alarm (32), which may include, for example, selecting an asset tag point the alarm is for and a type of alarm, and any parameters for defining the alarm condition. User interface 12 also presents an option for the operator to define a one-time trigger condition for the alarm being defined. User interface 12 may receive a user input defining the one-time trigger condition for the alarm (34), such as by setting an associated tag point and/or threshold values for the one-time trigger condition. In response to user interface 12 receiving the user inputs defining the alarm and the one-time trigger condition, asset monitoring system 18 may store information for the alarm and the one-time trigger condition to alarm rules 22 (36). For example, asset monitoring system 18 may add an entry for the alarm and alarm condition to alarm rules 22, and may add an entry for the one-time trigger to one-time trigger state 25. In some examples, when an alarm has a one-time trigger condition, the associated entry in alarm rules 22 may contain a pointer to the associated entry in one-time trigger state 25.

Data collector 24 collects data from infrastructure assets 14 (38), including data for any tag point referenced by the one-time trigger condition of asset 14A, for example. If rules engine 20 of asset monitoring system 18 determines the data indicates the one-time trigger condition is satisfied (YES branch of 40), rules engine 20 may store an indication that the one-time trigger condition is satisfied, such as by setting a flag in one-time trigger state 25 (42). In some examples, the one-time trigger condition does not depend on data collection for a tag point, but rather on some other source of information, such as customer data records (e.g., indicating occupancy status of data center space). In this case, asset monitoring system 18 determines the one-time trigger condition is satisfied based on the relevant data source.

Figure 4:
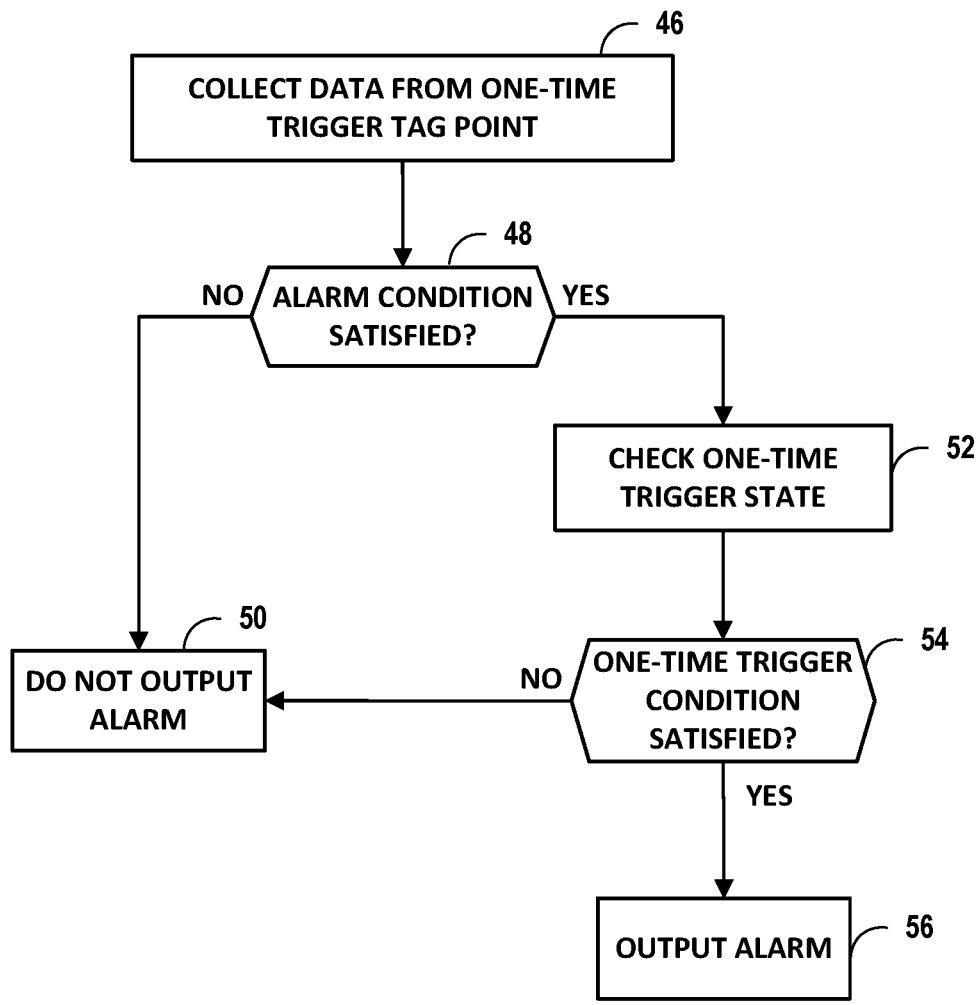
FIG. 4 is a flowchart illustrating example operation of a system according to aspects of the techniques of this disclosure.

FIG. 4 is a flowchart illustrating example operation of a system according to aspects of the techniques of this disclosure. FIG. 4 may illustrate operation followed after the operations of FIG. 3 have occurred. Data collector 24 collects data from infrastructure assets 14 (46), including data for the tag point of asset 14A referenced by the alarm rule configured in FIG. 3. If rules engine 20 of asset monitoring system 18 does not detect the alarm condition is satisfied (NO branch of 48), asset monitoring system 18 does not output an alarm (50). If rules engine 20 determines that the alarm condition is satisfied (YES branch of 48), rules engine 20 may determine whether the one-time trigger condition has yet been met by checking one-time trigger state 25 (52). In some examples, rules engine 20 may only check one-time trigger state 25 if the satisfied alarm rule of alarm rules 22 contains a pointer to an entry of one-time trigger state 25. If rules engine 20 determines that the one-time trigger condition has not yet been met (i.e., satisfied) (NO branch of 54), even if rules engine 20 detects the alarm condition is satisfied, asset monitoring system 18 does not cause notification module 21 to output an alarm (50) because the one-time trigger condition has not yet been met.

If rules engine 20 determines that the one-time trigger condition has been met (YES branch of 54), notification module 21 of asset monitoring system 18 outputs an alarm (56). Even if the one-time trigger condition was met earlier in time than the alarm condition detection (and may no longer be met at the time the alarm condition is detected), asset monitoring system 18 still outputs the alarm.

Figure 5:
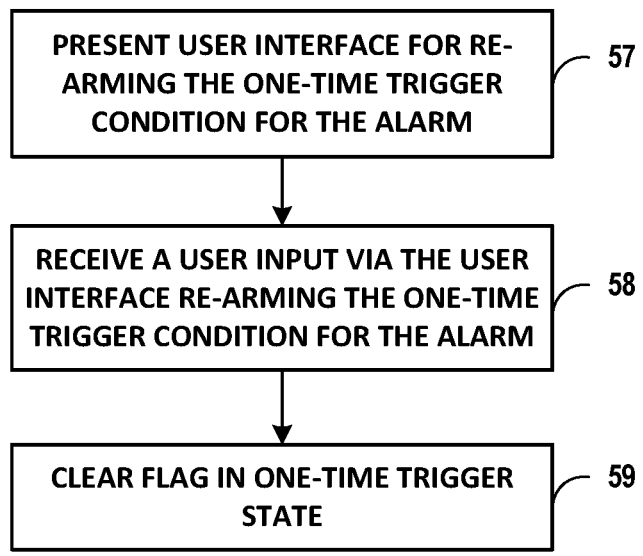
FIG. 5 is a flowchart illustrating example operation of a system according to aspects of the techniques of this disclosure.

FIG. 5 is a flowchart illustrating example operation of a system according to aspects of the techniques of this disclosure. In some examples, e.g., after outputting an alarm, asset monitoring system 18 may present a user interface via user interface 12 giving the operator an option to re-arm the one-time trigger condition for the alarm (57). In response to receiving a user input via the user interface re-arming the one-time trigger condition for the alarm (58), asset monitoring system 18 may clear the flag in one-time trigger state 25 (59). after this, in response to determining that the alarm condition is met and the one-time trigger condition has not yet been met at least once since receiving the user input re-arming the one-time trigger condition, asset monitoring system 18 suppressing output of notifications for the alarm. That is, rules engine 20 will not cause notification module 21 to output a notification when the alarm condition is detected, because the flag for the one-time trigger condition is not set.

In this manner, the techniques of this disclosure may limit nuisance alarms in a monitoring or control system. This may enable operators to better focus on critical system operation by only being presented with valid alarms. The techniques may also enable alarms to be configured for out of service or not yet commissioned equipment, and for those alarms to be enabled automatically and without operator intervention when the equipment comes into operation. The techniques of this disclosure may decrease an amount of time system operators spend regarding alarm events which are not relevant, and may in turn provide more time to focus on operation of critical systems. The techniques of this disclosure are generally applicable to monitoring and control systems that may in some examples be offered as a software package.

Figure 6:
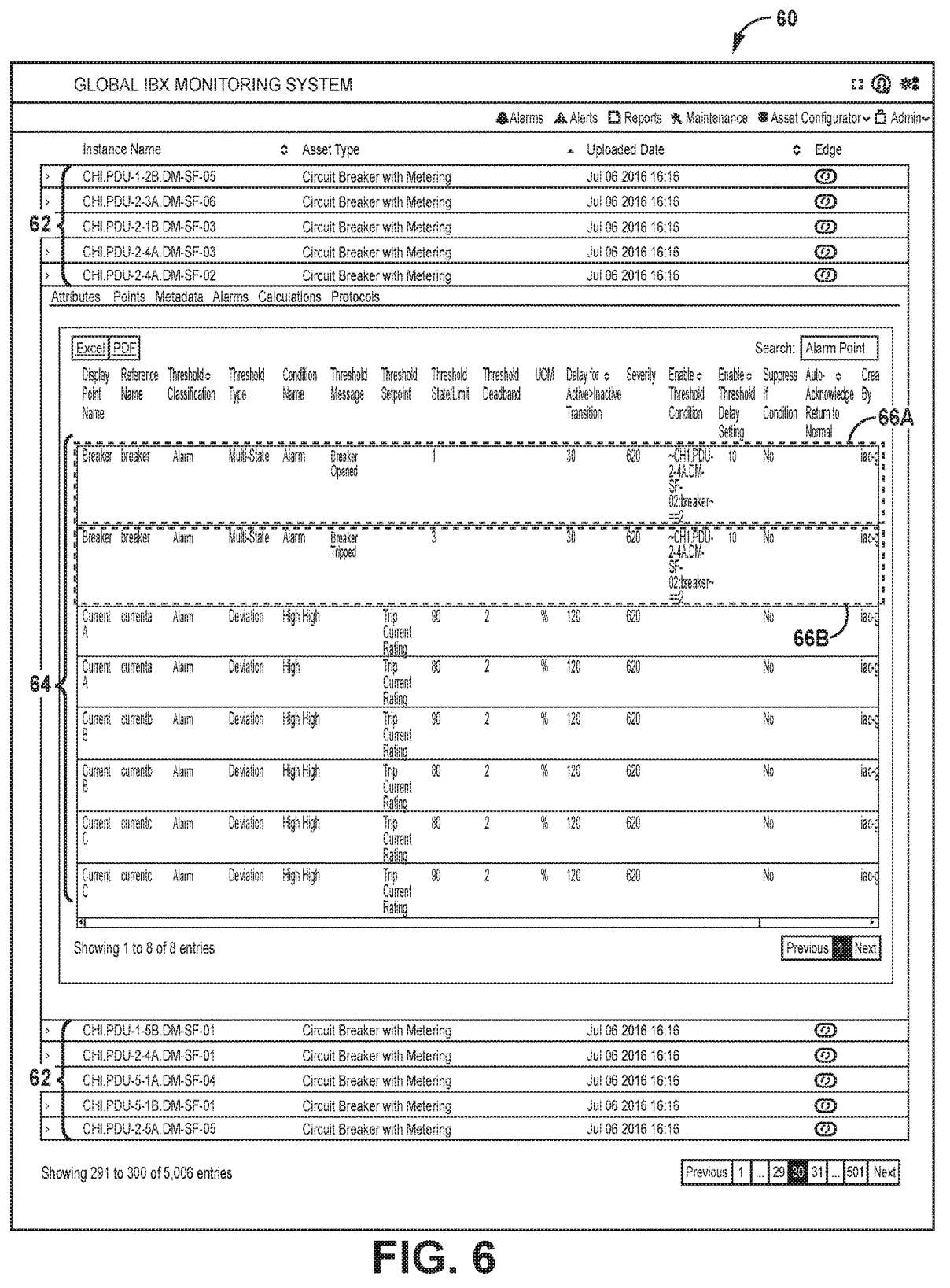

FIG. 6 depicts an example user interface 60 of an asset monitoring system such as asset monitoring system 18 (FIG. 1). For example, user interface 60 may be presented to an operator of a data center (e.g., data center 16). User interface 60 displays a list of assets 62 in the data center 16. In the example of FIG. 6, the asset types are power distribution unit (PDU) circuit breakers. User interface 60 presents an option to view a list of alarms defined for tag points for any of the assets 62.

In the example of FIG. 6, user interface 60 shows a list of alarms 64 associated with tag points of a circuit breaker labeled "CH1.PDU-2-4A.DM-SF-02." Alarm 66A for this circuit breaker defines an alarm condition having a Threshold Message of "Breaker Opened." Breaker Opened is an alarm indicating occurrence of a manual operation moving the circuit breaker to an open state without regard to presence of electrical current. The Threshold/State Limit of Alarm 66A is 1, which corresponds to an "OPEN" state and outputting the threshold message of "Breaker Opened." In some examples, the Threshold/State Limit values correspond to State text labels displayed in the user interface 60. In this example, the values map to the following State text labels: 0 ERROR; 1 OPEN; 2 CLOSED; 3 TRIPPED; 4 RACKED OUT; 5 TEST.

User interface 60 can receive a user input defining an Enable Threshold Condition (one-time trigger condition). The Enable Threshold Condition may include a reference to a name of the Tag Point for the condition, and threshold value. In the example of FIG. 6, user interface 60 receives a user input requiring that the CH1.PDU-2-4A.DM-SF-02 PDU circuit breaker measure at least 2 Amps of current. Although shown as 2 Amps, any value greater than zero may be used, such as a value between 0-100 Amps. In this case, the tag point referenced by the Enable Threshold Condition is the same tag point referenced by the alarm 62A. In other examples, the tag point referenced by the Enable Threshold Condition may be a different tag point than that referenced by the alarm.

In some examples, user interface 60 can present multiple pre-defined options of Enable Threshold Condition values from which an operator can select for making the user input defining the Enable Threshold Condition. In some examples, an operator can define an Enable Threshold Condition for individual infrastructure assets, such as via a user interface like user interface 60. In some examples, an operator can define an Enable Threshold Condition for an entire class of assets, such as for all PDUs, or all PDUs in a particular data center. In some examples, a type of asset may be associated with a template that is pre-defined with various settings and alarms for the type of asset. In this way, an operator can select a template for a PDU, for example, and the PDU is configured in an infrastructure asset management system as initially having all the pre-defined settings and alarms.

User interface 60 can receive another user input defining an Enable Threshold Delay setting, which may be defined as a time in minutes, for example. In this example, the Enable Threshold Delay setting is set for 10 minutes. Thus, according to the alarm 66A definition, CH1.PDU-2-4A.DM-SF-02 circuit breaker must be closed for at least 10 minutes with at least 2 Amps flowing through before the alarm 66A is enabled. If the breaker is closed for a time period less than the Enable Threshold Delay setting, alarm 66A will not be enabled.

Alarm 66B for the circuit breaker defines an alarm condition having a Threshold Message of "Breaker Tripped." Breaker Tripped is an alarm indicating electrical current has reached the device tripping threshold, causing the circuit breaker to automatically open. The Threshold/State Limit of Alarm 66B has a value of 3, which corresponds to a "TRIPPED" state and outputting the threshold message of "Breaker Tripped." In some examples, threshold/

State Limit may define a deviation limit, and may be defined in terms of percent away from Alarm Setpoint, or an absolute limit in point engineering units, for example. Alarms 66A and 66B each define a Delay for Inactive/Active Transition of 30 seconds.

Figure 7:
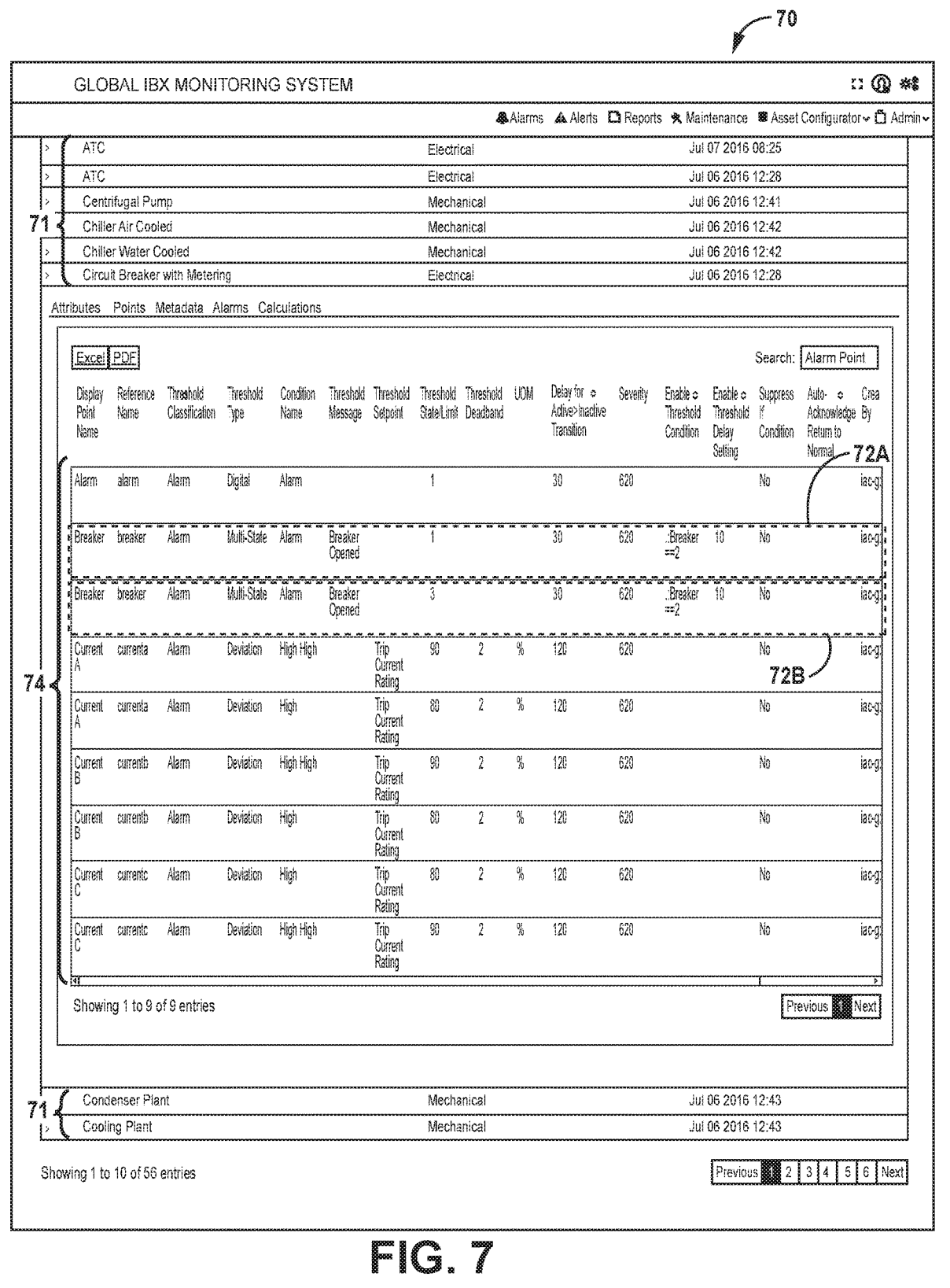

FIG. 7 depicts another example user interface 70 of an asset monitoring system. User interface 70 illustrates an example template display using one-time triggers for enabling alarms. In the example of FIG. 7, user interface 70 displays a list of infrastructure asset templates 71, including templates for Automatic Transfer Control (ATC), Automatic Transfer Switch (ATS), Centrifugal Pump, Chiller Air Cooled, Chiller Water Cooled, Circuit Breaker with Metering, Condenser Plant, and Cooling Plant. Some of the infrastructure assets are Electrical type assets, while others are Mechanical type assets. User interface 70 includes a Circuit Breaker with Metering template having a list of alarms 74 associated with tag points in the Circuit Breaker with Metering template. The list of alarms 74 includes a Breaker Opened alarm 72A defined with an Enable Threshold Condition of the breaker drawing 2 Amps for at least 10 minutes, and having a Breaker Tripped alarm 72B defined with the same Enable Threshold condition.

User interface 70 illustrates that an Enable Threshold Condition (i.e., one-time trigger) can be defined for infrastructure asset templates, and therefore applied to an entire class or type of asset without requiring the condition to be defined for individual assets. When a particular individual asset is associated with an asset template, the individual asset automatically inherits all of the alarms defined for the asset template.

For example, when an operator (e.g., Operations Engineer) is defining a template for an infrastructure asset, the operator provides details of all the infra asset points and alarms and the following process may be used. 1. Enter Infra Asset Template Name: Name of the Asset Type. Eg: UPS, Generator. 2. Operations Column can either take "ADD" or "DELETE" values. i. First time setup: Entries should marked as "ADD". ii. To delete: Mark the column as "DELETE". iii. To edit: Mark the column as "DELETE" and add additional column with the edited information as "ADD". 3. Standard Point Name: may be a Mandatory field, selected from list of pre-defined values. 4. Display Screen Name: Operations Engineer should provide generic name for each point. This name would be used in all Internal/Customer applications as a point name. 5. Point Type: Analog, Binary and Multi-State (Should be on Asset Instance). 5. Unit of Measure: Operations Engineer to provide point level unit of measure. 6. Alarms: Operations Engineer to provide alarms threshold levels for each point. 7. Trend COV (covariance): Operations Engineer to provide Point level COV trending capabilities. By Value(COV)—Y or N to indicate Trend by COV; By Deviation (%)—Percentage value indicates this has to be calculated with the provided value; By Time (in mins)—Mins value indicates this value has to be calculated with the provided value. 8. Send Txt/Email to Engineers: Check to enable alarm. Alarm will be sent via text messages, email or both to the site engineers. 9. Send SNMP to Data Center Operations Monitoring Specialist: Check to enable alarm. Alarm will be sent to the Data Center Operations Monitoring Specialist via SNMP trap. By default, any alarm that is enabled will be sent to the EOC. 10. Actionable by Data Center Operations Monitoring Specialist: Check to enable alarm. Alarm occurs, the Data Center Operations Monitoring Specialist will proceed with its standard notification protocol for the data center site.

Figure 8:
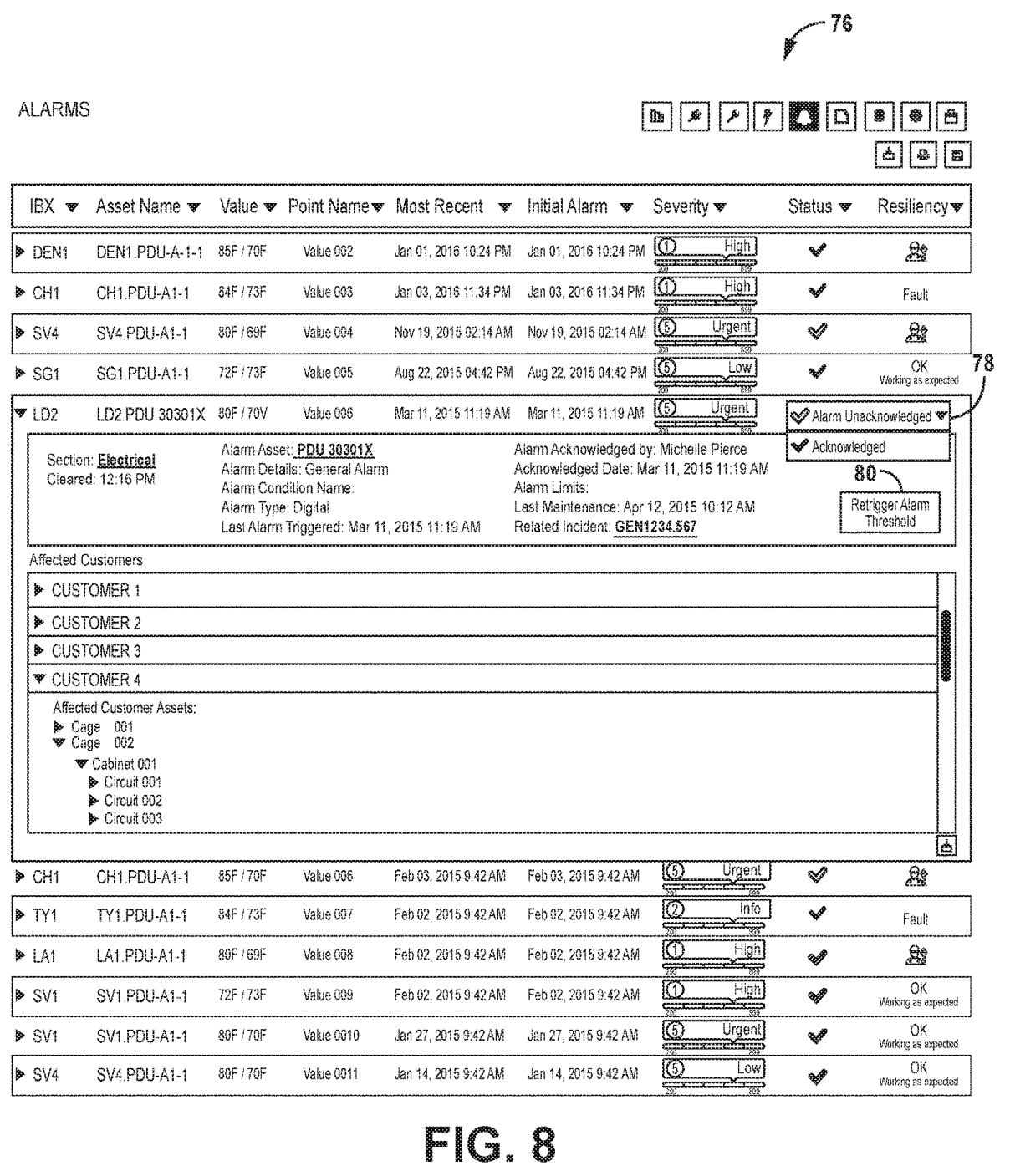

FIG. 8 is a block diagram illustrating an example user interface 76 for presenting an option to an operator to retrigger an Enable Threshold Condition (one-time trigger condition) for an alarm. User interface 76 may be presented at some point in time after the Enable Threshold Condition was met and the alarm (e.g., alarm 106A of FIG. 4) is thereby enabled. In the example of FIG. 8, a PDU having asset name LD2.PDU 30301X has an urgent alarm raised, where the alarm is a "general Alarm" type. User interface 76 presents a dropdown box 78 that enables an operator to set the alarm as "Acknowledged."

User interface 76 also presents a Retrigger Alarm Threshold button 80, which an operator can select to retrigger (i.e., re-arm) the alarm threshold that was defined for the alarm. In response to receiving an indication of a user input selecting to retrigger the enable threshold condition, asset monitoring system 18 may retrigger the enable threshold condition, such as by clearing a flag in one-time trigger state 25 for the enable threshold condition, thus resetting the condition to a state as if the condition had never been met. That is, in response to determining that the alarm condition is met and the one-time trigger condition has not yet been met at least once since receiving the user input selecting to retrigger the enable threshold condition, asset monitoring system 18 suppresses output of notifications for the alarm. In some examples, in response to receiving an indication of a user input selecting to retrigger the enable threshold condition, asset monitoring system 18 may output a subsequent user interface window confirming that the operator indeed wishes to retrigger the enable threshold condition, as in the example of FIG. 9.

Figure 9:
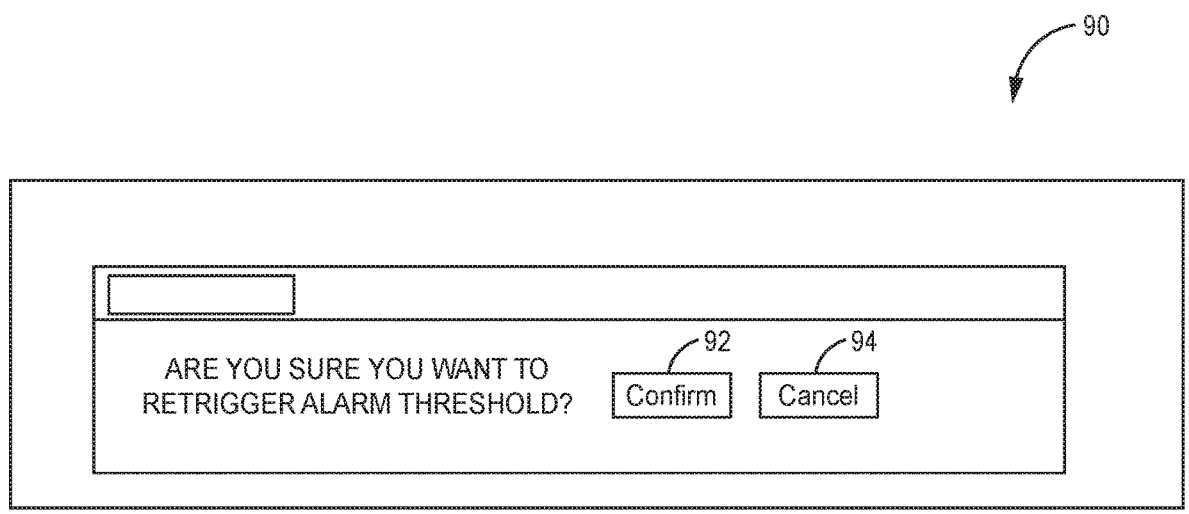
FIG. 9 is a block diagram illustrating an example user interface for soliciting a user input to confirm the operator intends to retrigger the enable threshold condition.

FIG. 9 is a block diagram illustrating an example user interface 90 for soliciting a user input to confirm the operator intends to retrigger the enable threshold condition. For example, user interface 90 outputs a confirmation message of "Are you sure you want to Retrigger Alarm Threshold?" User interface 90 also includes a confirm button 92 and a cancel button 94 by which an operator can respond to the confirmation message. In response to receiving an indication of a user input selecting to confirm the request to retrigger the enable threshold condition, asset monitoring system 18 may retrigger the enable threshold condition, resetting the condition to a state as if the condition had never been met. Alternatively, in response to receiving an indication of a user input selecting to cancel the request to retrigger the enable threshold condition, asset monitoring system 18 may not retrigger the enable threshold condition.

Figure 10:
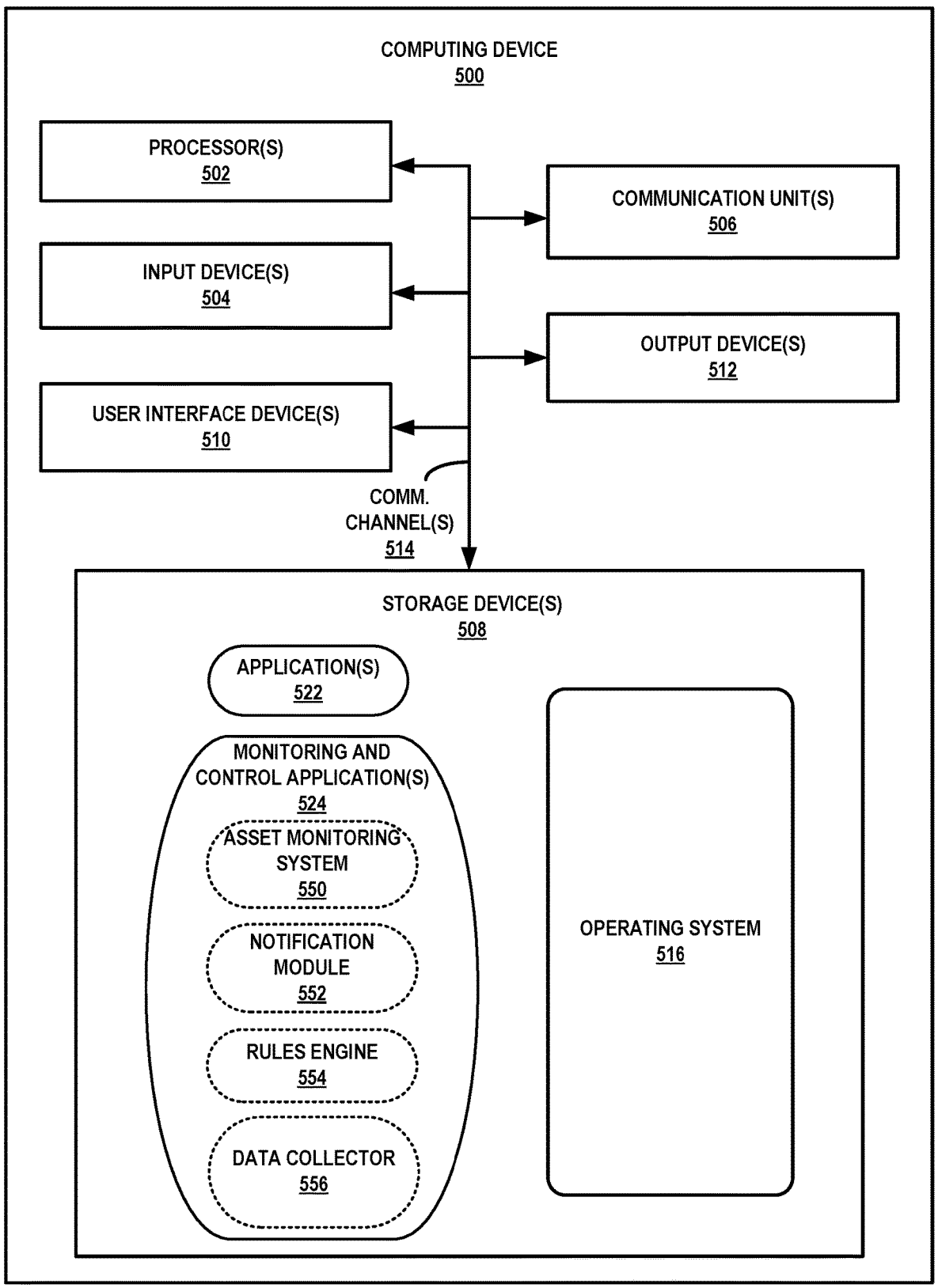
FIG. 10 is a block diagram illustrating further details of one example of a computing device that operates in accordance with one or more techniques of this disclosure.

FIG. 10 is a block diagram illustrating further details of one example of a computing device that operates in accordance with one or more techniques of the present disclosure. FIG. 10 may illustrate a particular example of a server or other computing device 500 that includes one or more processor(s) 502 for executing any one or more of asset monitoring system 550, notification module 552, rules engine 554, and data collector 556, or any other computing device described herein. Other examples of computing device 500 may be used in other instances. Computing device 500 may be, for example, asset monitoring system 18 (FIG. 1). Although shown in FIG. 10 as a stand-alone computing device 500 for purposes of example, a computing device may be any component or system that includes one or more processors or other suitable computing environment for executing software instructions and, for example, need not necessarily include one or more elements shown in FIG. 10 (e.g., communication units 506; and in some examples components such as storage device(s) 508 may not be colocated or in the same chassis as other components).

As shown in the example of FIG. 10 computing device 500 includes one or more processors 502, one or more input devices 504, one or more communication units 506, one or more output devices 512, one or more storage devices 508, and user interface (UI) device(s) 510. Computing device 500, in one example, further includes one or more application(s) 522, DCIM system application(s) 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510 may correspond to user interface 12 of FIG. 1, for example. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and DCIM system application(s) 524 with processors 502, communication unit 506, storage device 508, input device 504, user interface devices 510, and output device 512.

Application(s) 522 and monitoring and control application(s) 524 may also include program instructions and/or data that are executable by computing device 500. Example monitoring and control application(s) 524 executable by computing device 500 may include any one or more of asset monitoring system 550, notification module 552, rules engine 554, and data collector 556, each illustrated with dashed lines to indicate that these may or may not be executable by any given example of computing device 500. Other monitoring and control system applications not shown may alternatively or additionally be included, providing other functionality described herein. Asset monitoring system 550 may correspond to asset monitoring system 18 of FIG. 1, notification module 552 may correspond to notification module 21, rules engine 554 may correspond to rules engine 20, and data collector 556 may correspond to data collector 24.

In some examples, asset monitoring system 550 integrates with a customer portal and customer application programming interfaces (APIs) to enable role based access control for users of cross-functional nature, such as operations, sales and customer roles, along with access governance and perimeter access controls for each system. The global information may in some examples be used by DCIM operations monitoring infrastructure to develop certain features and mobile applications used by operation engineers and sales and marketing, including micro-services architecture driven feature based development of applications. In some examples, computing device 500 may use an API platform such as described in U.S. application Ser. No. 14/927,451, entitled INTERCONNECTION PLATFORM FOR REAL-TIME CONFIGURATION AND MANAGEMENT OF INTERCONNECTIONS WITHIN A CLOUD-BASED SERVICES EXCHANGE, filed Oct. 29, 2015, the entire contents of which are incorporated by reference herein.

In some examples, data collector 556 collects asset tag points and may perform data interfacing. In some examples, data collector 556 may also perform branch circuit monitoring (BCM) and power usage effectiveness (PUE) monitoring. In some examples, data collector 556 includes interfaces for various protocols by which data collector 556 receives data from BMSs, control systems, and meters, such as Open Platform Communications Data Access (OPC DA), Building Automation and Control Networks (BACNet), Modbus, Modbus over Ethernet (Modbus/E), eXtensible Markup Language (XML)/Simple Object Access Protocol (SOAP), and Simple Network Management Protocol (SNMP), for example. The received data may be data sensed and reported by sensors in the data center.

In some examples, asset monitoring system 550 includes DCIM tools such as a global data center (IBX) monitoring system (GIMS) for data center health monitoring, reporting and dashboards, and infrastructure asset usage analysis, and a visualization analytical tool for presenting and reviewing asset data information. The GIMS may be associated with several possible operational activities. For example, GIMS may be associated with operational management of power usage effectiveness (PUE), alerts and assets, along with management of templates, assets, points and access controls. GIMS may also be associated with real time analytics of historical data trends, asset maintenance, consistent asset view, asset status and fault information. In another example, GIMS may be associated with simulation and prediction of asset hierarchy traversal, one line diagram—what-if analysis, and time based query rules.

In some examples, alarms may each be configurable by data center operations administrators and/or by customer administrators. In some examples, one-time trigger conditions may be configurable only by data center operations administrators and not by customer administrators. For example, data center operations administrators or customer administrators may enter configuration data (e.g., via a customer portal or global IBX monitoring system) for creating and defining device alarms and setting alarm threshold values and one-time triggers.

Rules engine 554 triggers alarm notifications, such as by applying the configured alarm detection rules. Rules engine 554 qualifies an event as an alarm based on the applications of the alarm rules, and logs and forwards the alerts to notification module 552. Notification module 552 receives the alerts and creates tickets for the alerts (e.g., a ticket for each alert). Notification module 552 negotiates the alert recipient and transport mechanism. Notification module 552 provides message provisioning, e.g., via email using Simple Mail Transfer Protocol (SMTP) or Short Message Service (SMS).

In one example, computing device 500 may receive via user interface device 510, in addition to or independent from a one-time trigger condition, a request to create a conditional trigger for an alarm. For example, a user may click on a conditional trigger link and choose a second event that must occur in addition to the initially selected event in order for an alarm to be generated. For example, the request for the conditional trigger may specify a temperature event that was initially chosen, such as the temperature value exceeding 75 degrees, for example. The request for the conditional trigger may specify a second event that must occur for the conditional trigger to be true. For example, the user may subsequently click on the conditional trigger link and select a second event that must occur, such as that the power draw of an asset exceeds a given value, such as 85%, for example. Rules engine 554 may only determine that the alert is triggered if both the conditional trigger event, the temperature value exceeding 75 degrees, for example, and the second event, the power draw of an asset exceeds a given value, such as 85%, for example, are satisfied at the same time. Any combination of environmental, power draw, mechanical and electrical monitoring alerts may be generated so that a user may customize alerts to tell them certain specific information when one of any specific contingent events occur. In one example, computing device 500 may receive via user interface device 510*a* request to create a conditional alert such that when asset monitoring system 550 determines the utility power has gone out, notification module 552 sends notifications of temperature readings, since cooling systems typically go down during power outages. As a result, the temperature readings may be limited to being sent to the user only when the power goes out, for example.

In this way, computing device 500 may output for display a user interface via user interface devices 510 for configuring an alarm, wherein the user interface presents options for receiving input specifying one or more data center assets to monitor for a primary alarm event, an event type for the primary alarm event, and a conditional trigger event upon which raising the alarm will be conditioned, receive a user input configuring the alarm, and store configuration data for the configured alarm based on the user input. The DCIM system described herein may then monitor the one or more data center assets for the conditional trigger event and the primary alarm event, and in response to detecting the conditional trigger event and the primary alarm event associated with the configured alarm, raise the configured alarm. In some examples, the user interface may present options for specifying a conditional trigger event in addition to a one-time trigger event, as described above, for alarms or alerts.

As an example, asset monitoring system module 550 is configured to receive first data defining an alarm associated with an infrastructure asset, the alarm having an alarm condition that causes a notification to be output indicating the alarm condition is met, and receive second data defining a one-time trigger condition for the alarm. Rules engine 554 is configured to determine whether the alarm condition is met and determine whether the one-time trigger condition for the alarm is met. Asset monitoring system module 550 is configured to, in response to rules engine 554 determining that the alarm condition is met and the one-time trigger condition for the alarm has not been met at least once, suppress output of notifications for the alarm. Asset monitoring system module 550 is configured to, in response to the rules engine determining that the alarm condition is met and the one-time trigger condition for the alarm has been met at least once, cause output device 512 to output for display the notification indicating the alarm condition is met.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset. If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor. A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media. In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following examples.

What is claimed is:

1. A method comprising:
   receiving, by a computing system, first data defining an alarm associated with an infrastructure asset, the alarm having an alarm condition that causes a notification to be output indicating the alarm condition is met;
   receiving, by the computing system, second data defining a one-time trigger condition for the alarm, wherein the one-time trigger condition being met at least once enables the alarm;
   storing, by the computing system, configuration data for the alarm based on the first data and the second data;
   in response to determining that the alarm condition is met at a first point in time and the one-time trigger condition for the alarm has not been met prior to the first point in time, suppressing, by the computing system, output of the notification;
   in response to determining that the alarm condition is met at a second point in time and the one-time trigger condition for the alarm has been met prior to the second point in time and is not met at the second point in time, outputting, by the computing system and for display, the notification;
   receiving, by the computing system, third data re-arming the one-time trigger condition; and
   after receiving the third data, in response to determining that the alarm condition is met and the one-time trigger condition has not yet been met at least once since receiving the third data, suppressing output of the notification.

2. The method of claim 1, further comprising:
   collecting data from the infrastructure asset; and
   determining, by the computing system and based on the collected data, whether the alarm condition is met.

3. The method of claim 1, further comprising:
   determining, by the computing system, that the one-time trigger condition has occurred;
   setting, by the computing system and in response to detecting the one-time trigger condition has occurred, a flag in a data structure indicating the one-time trigger condition has occurred such that the flag remains set even if the one-time trigger condition trigger ceases to occur; and
   in response to determining that the alarm condition is met, checking, by the computing system, whether the flag is set to determine whether the one-time trigger condition has been met at least once,
   wherein determining that the one-time trigger condition has not been met at least once comprises in response to checking whether the flag is set, determining the flag is not set, and
   wherein determining that the one-time trigger condition has been met at least once comprises in response to checking whether the flag is set, determining the flag is set even if the one-time trigger condition is not currently occurring at a time the alarm condition is met.

4. The method of claim 1, wherein receiving the first data comprises receiving an indication of a first user input via a user interface, and wherein receiving the second data comprises receiving an indication of a second user input via the user interface.

5. The method of claim 1, wherein the alarm condition is associated with a first tag point for the infrastructure asset, and wherein the one-time trigger condition is associated with a second tag point for the infrastructure asset, the method further comprising:
   collecting, by the computing system, data for the first tag point; and
   collecting, by the computing system, data for the second tag point.

6. The method of claim 1, wherein the infrastructure asset is a first infrastructure asset, and wherein the one-time trigger condition refers to a second infrastructure asset distinct from the first infrastructure asset.

7. The method of claim 1, wherein the one-time trigger condition refers to customer data in a customer system of record.

8. The method of claim 1, wherein receiving the first data defining the alarm comprises receiving first data defining an alarm for an infrastructure asset template,
   wherein receiving the second data comprises receiving second data defining the one-time trigger condition for the infrastructure asset template, the method further comprising:
   detecting a new infrastructure asset associated with the infrastructure asset template; and
   automatically associating the alarm and the one-time trigger condition with the new infrastructure asset.

9. The method of claim 1, wherein the computing system comprises a branch circuit monitoring system, and wherein the infrastructure asset comprises a circuit monitored by the branch circuit monitoring system.

10. The method of claim 1, wherein the computing system comprises a data center infrastructure monitoring system for monitoring a plurality of infrastructure assets positioned within respective ones of a plurality of geographically distributed data centers.

11. A computing device comprising:
   an asset monitoring system module configured to receive first data defining an alarm associated with an infrastructure asset, the alarm having an alarm condition that causes a notification to be output indicating the alarm condition is met, receive second data defining a one-time trigger condition for the alarm, wherein the one-time trigger condition being met at least once enables the alarm, and receive third data re-arming the one-time trigger condition;

a data structure, wherein the asset monitoring system module stores, to the data structure, configuration data for the alarm based on the first data and the second data;

a rules engine configured to determine whether the alarm condition is met and determine whether the one-time trigger condition for the alarm is met, wherein the asset monitoring system module is configured to, in response to the rules engine determining that the alarm condition is met at the first point in time and the one-time trigger condition for the alarm has not been met prior to the first point in time, suppress output of the notification; and after receiving the third data and in response to the rules engine determining that the alarm condition is met and the one-time trigger condition has not yet been met at least once since receiving the third data, suppress output of the notification; and an output device, wherein the asset monitoring system module is configured to, in response to the rules engine determining that the alarm condition is met at a second point in time and the one-time trigger condition for the alarm has been met prior to the second point in time and is not met at the second point in time, cause the output device to output for display the notification.

12. The computing device of claim 11, further comprising:

a data collector module to collect data from the infrastructure asset, wherein the asset monitoring system module determines, based on the collected data, whether the alarm condition is met.

13. The computing device of claim 11, further comprising:

a user interface, wherein the computing device receives an indication of a first user input via the user interface, and wherein the computing device receives an indication of a second user input via the user interface.

14. The computing device of claim 11, wherein the alarm condition is associated with a first tag point for the infrastructure asset, and wherein the one-time trigger condition is associated with a second tag point for the infrastructure asset, wherein the asset monitoring system module is further configured to collect data for the first tag point, and collect data for the second tag point.

15. The computing device of claim 11, wherein the infrastructure asset is a first infrastructure asset, and wherein the one-time trigger condition refers to a second infrastructure asset distinct from the first infrastructure asset.

16. A non-transitory computer-readable storage medium comprising instructions that, when executed by at least one programmable processor of at least one computing device, cause the at least one computing device to:

receive first data defining an alarm associated with an infrastructure asset, the alarm having an alarm condition that causes a notification to be output indicating the alarm condition is met;

store configuration data for the alarm based on the first data and the second data;

receive second data defining a one-time trigger condition for the alarm, wherein the one-time trigger condition being met at least once enables the alarm;

in response to determining that the alarm condition is met at a first point in time and the one-time trigger condition for the alarm has not been met prior to the first point in time, suppress output of the notification;

in response to determining that the alarm condition is met at the second point in time and the one-time trigger condition for the alarm has been met prior to the second point in time and is not met at the second point in time, output for display the notification;

receive third data re-arming the one-time trigger condition; and after receiving the third data, in response to determining that the alarm condition is met and the one-time trigger condition has not yet been met at least once since receiving the third data, suppress output of the notification.

* * * * *